United States Patent [19]

Schoen

[11] Patent Number: 5,530,646

[45] Date of Patent: Jun. 25, 1996

[54] METHOD FOR INPUTTING SEISMIC DATA FOR SEISMIC PROCESSING ON A MULTIPROCESSOR COMPUTER

[75] Inventor: Eric J. Schoen, Austin, Tex.

[73] Assignee: Schlumberger Technology Corporation, Austin, Tex.

[21] Appl. No.: 421,140

[22] Filed: Apr. 13, 1995

Related U.S. Application Data

[63] Continuation of Ser. No. 160,123, Dec. 1, 1993, abandoned.

[51] Int. Cl.$^6$ .................................................. G06F 19/00
[52] U.S. Cl. .................................................. 364/421
[58] Field of Search .................................. 364/420, 421, 364/422; 367/51, 53, 38, 58, 69, 72

[56] References Cited

U.S. PATENT DOCUMENTS

| 4,744,064 | 5/1988 | Hughes | 367/22 |
| 5,138,584 | 8/1992 | Hale | 367/53 |
| 5,198,979 | 3/1993 | Moorhead et al. | 364/421 |

FOREIGN PATENT DOCUMENTS

| 9313434 | 7/1993 | WIPO . | |

OTHER PUBLICATIONS

"Three Dimensional Imaging of Reflection Seismic Wavefields Using Parallel Computers", Kapotas, 1991, Thesis, University of Alberta, pp. 9–13, 100–101 and 167.

ICASSP 1988, New York, NY, Cat. No. 88CH2561-9, Madisetti et al., "Seismic Migration Algorithms Using the FFT Approach of the NCUBE Multiprocessor", 1988, pp. 894–897.

International Preliminary Examination Report dated Aug. 2, 1995, PCT International Application No. PCT/US 94/13704, Schlumberger Technology Corporation, filed Jan. 12, 1994.

Meinardus, H. A. and K. L. Schleicher, Jul. 1993, 3-D time-variant dip moveout by the f-k method, *Geophysics*, vol. 58, No. 7, 1030–1041.

Reshef, M., Aug. 1991. Prestack depth imaging of three-dimensional shot gathers. *Geophysics*, vol. 56, No. 8, 1158–1163.

Reynolds, S., Jun. 1993. Parallel computing in seismic data processing. *The Leading Edge*, vol. 12, No. 6, 687–692.

*Primary Examiner*—Donald E. McElheny, Jr.
*Attorney, Agent, or Firm*—Charles D. Huston

[57] ABSTRACT

This invention provides a method for inputting seismic trace data to a seismic processing program running on a massively parallel processor (MPP). The MPP, consisting of a plurality of individual processing nodes connected by a data and control communications network, is treated as a bipartite system of "operator" nodes and "input" nodes. Operator nodes apply mathematical operators to transform seismic data. Groups of seismic traces are loaded into the input nodes. The input nodes examine the data to determine which regions of the seismic survey are covered by the traces. The input nodes then broadcast to all operator nodes a compact description of the trace coverage. The operator nodes then retrieve traces from the input nodes, using efficient data transfer mechanisms of the data network. The input nodes can be seen to serve as a distributed, content-addressable data cache. In the preferred embodiment of the invention, the input nodes read trace data from a disk storage system using techniques that are efficient over a large range of numbers of nodes in the MPP and disks in the disk system. Thus, the invention provides an efficient method that can be used with MPP systems of various sizes.

16 Claims, 10 Drawing Sheets

Prior Art

| | 10 | 10 | 10 | 10 | 10 | 10 | 10 | 10 | 11 | 11 | 11 | 11 | 11 | 11 | 11 | 11 | 12 | 12 | 12 | 12 | |
|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | |
| | | 7 | 7 | 7 | 7 | 7 | 7 | 7 | 8 | | 8 | 8 | 8 | 8 | 8 | 8 | 9 | 9 | 9 | | |
| | | 1 | 2 | 3 | 4 | 5 | 6 | 7 | 8 | 1 | | 3 | 4 | 5 | 6 | 7 | 8 | 1 | 2 | 3 | |
| | | | | | | | | | | | | | | | | | | | | | |
| | | 4 | 4 | 4 | 4 | 4 | 4 | 4 | 4 | 5 | 5 | 5 | 5 | 5 | 5 | 5 | 5 | 6 | 6 | 6 | 6 |
| | | 1 | 2 | 3 | 4 | 5 | 6 | 7 | 8 | 1 | 2 | 3 | 4 | 5 | 6 | 7 | 8 | 1 | 2 | 3 | 4 |
| 1 | 1 | 1 | 1 | 1 | 1 | 1 | 1 | 1 | 2 | 2 | 2 | 2 | 2 | 2 | 2 | 2 | 3 | 3 | 3 | | |
| 1 | 2 | 3 | 4 | 5 | 6 | 7 | 8 | 1 | 2 | 3 | 4 | 5 | 6 | 7 | 8 | 1 | 2 | 3 | | | |

| Row | 1st Run | | 2nd Run | | 3rd Run | | 4th Run | |
|---|---|---|---|---|---|---|---|---|
| | Col | Len | Col | Len | Col | Len | Col | Len |
| 1 | 1 | 19 | | | | | | |
| 2 | 2 | 20 | | | | | | |
| 3 | | | | | | | | |
| 4 | 3 | 9 | 13 | 9 | | | | |
| 5 | 2 | 20 | | | | | | |

METHOD FOR INPUTTING SEISMIC DATA FOR SEISMIC PROCESSING ON A MULTIPROCESSOR COMPUTER

This is a Continuation of application Ser. No. 08/160,123 filed Dec. 1, 1993 now abandoned.

TECHNICAL FIELD

This invention relates to seismic data processing on multiprocessor computers. In particular, the present invention relates to a method of inputting prestack seismic data for processing on a multiprocessor computer.

BACKGROUND OF THE INVENTION

Seismic Acquisition & Processing

The Earth's subsurface can be imaged by a seismic survey, therefore, seismic data acquisition and processing are key components in geophysical exploration. In a seismic survey, elastic acoustic waves are generated by a source at the Earth's surface and the waves are radiated into the Earth's subsurface. For land seismic surveys, the usual source is dynamite or a seismic vibrator, while for a marine seismic survey the source is typically an airgun array.

As the waves radiate downward through the Earth's subsurface, they reflect and propagate upwards towards the surface whenever the subsurface medium changes. The upward reflections are detected by a number of receivers and the reflected data recorded and processed in order to image the subsurface. Interpretation of these acoustic images of the subsurface formation leads to the structural description of the subsurface geological features, such as faults, salt domes, anticlines, or other features indicative of hydrocarbon traps.

While two dimensional ("2D") seismic surveys have been conducted since the 1920's, three dimensional ("3D") seismic surveys have only recently become widely used. 3D surveys more accurately reflect the subsurface positions of the hydrocarbon traps, but are expensive and time consuming to acquire and process. For an offshore 3D data set covering a 20×20 km area, it costs about $3M dollars (1991 dollars) to acquire the data with another $1M dollars for data processing to transform the raw data into usable images. Because the cost of such a seismic survey is considerably less than the cost of drilling an offshore oil well, 3D seismic surveys are often worth the investment.

One common type of seismic survey is a marine survey, performed by boats in offshore waters. To record seismic data, a boat tows airguns (seismic sources) near its stern, and an up to 5 km long "streamer" containing hydrophones (seismic receivers) along its length. As the boat sails forward, it fires one source and receives a series of echoes into each seismic receiver. For each source-receiver pair, one prestack seismic trace is created. Each trace records sound waves that echo from abrupt acoustic impedance changes in rock beneath the ocean floor. Also recorded in a prestack trace, in a header section of the trace record, is information about the location of the source and receiver. See, K. M. Barry, D. A. Cavers, and C. W. Kneale. 1975. Recommended Standards for digital tape formats. *Geophysics*, 40, 344–352. Reprinted in *Digital Tape Standards*, Society of Exploration Geophysicists. 1980. Prestack traces are not associated with any particular area of the survey. Each echo that appears in a prestack trace is caused by a reflector that lies somewhere along, and tangent to, an elliptical path whose foci are the seismic source and receiver.

The spatial relationship between sources and receivers in a land seismic acquisition scenario differs from that described above; however, the present invention is unaffected by this.

A seismic survey is performed over a bounded region of the earth. This region is generally, but not necessarily precisely, rectangular. The survey area is partitioned into an array of bins. "Binning" is the assignment of traces to a survey array-usually a 12.5 by 25 meter rectangle. Any particular bin is located by its Cartesian coordinates in this array (i.e., by its row and column number). The ultimate output of the seismic survey is data that shows the location and strength of seismic reflectors in each bin, as a function of depth or time. This information cannot be deduced directly, but rather must be computed by applying numerous data processing steps to data recorded.

Although 3D marine surveys vary widely in size (1,000 to 100,000 $km^2$), a typical marine survey might generate in excess of 40,000 data acquisition tapes. Data is accumulated at a staggering rate, about 1.5 million data samples every 10 seconds. A significant amount of time and money is spent in processing this enormous amount of data. The result of the seismic survey is thus an enormous amount of raw data indicative of reflected signals which are a function of travel time, propagation, and reflection effects. The goal is to present the reflected amplitudes as a function of lateral position and depth.

A typical marine seismic survey goes through three distinct sequential stages-data acquisition, data processing, and data interpretation. Data processing is by far the most time consuming process of the three. The acquisition time for a medium to large 3D marine seismic survey is in the order of two months. In addition to seismic data, navigation information is also recorded for accurate positioning of the sources and receivers. The resulting digital data must be rendered suitable for interpretation purposes by processing the data at an onshore processing center. The processing sequence can be divided into the following five processing steps.

1. Quality Control, filtering and deconvolution. This processing is applied on a trace basis to filter noise, sharpen the recorded response, suppress multiple echoes, and generally improve the signal-to-noise ratio. Most of these signal processing operations can be highly vectorized.

2. Velocity analyses for migration. This processing estimates the velocity of the sub-surface formations from the recorded data by modeling the propagation of acoustic waves with estimated velocities and checking for signal coherence in the acquired data. It is similar to migration but is applied to a small section of the data cube.

3. 3D dip moveout correction and stacking. This processing step, generally the most input/output intensive part of the processing, (i) sums together several traces in order to eliminate redundancy and increase the signal-to-noise ratio, (ii) corrects for time delays that occur when the reflected signal is recorded by successive hydrophones that are located increasingly farther away from the energy source, and (iii) positions and orients the stacked data in accordance with the navigation information. After this processing step, the data is referred to as stacked data. This step normally constitutes on the order of a 100 to 1 reduction in data volume.

4. Migration. This processing step, computationally the most intensive, relocates the position of reflected strata, that are recorded in time, to their correct position in depth.

5. Enhancement and filtering. This processing step is used to enhance the migrated data using digital filtering techniques.

The stacking process (step 3) reduces the amount of data to what is essentially a three dimensional array of numbers (i.e. a data cube) representing amplitudes of reflected seismic waves recorded over a period of time (usually 8 seconds). Such data cubes can be large, for example, a medium size 3D survey may produce cubes as large as 1000×1000×2000 of floating-point numbers.

The stacked data cube represents a surface recording of acoustic echoes returned from the earth interior and is not usually directly interpretable. The migration (or acoustic imaging process, step 4) is used to convert stacked data into an image or a map which can then be viewed as a true depth map cut out of the survey area.

Thus, migration is one of the most critical and most time consuming components in seismic processing is migration. Generally speaking, migration transforms the seismic data recorded as a function of time into data positioned as a function of depth using preliminary knowledge of the propagation velocities of the subsurface. In particular, migration moves dipping reflectors to their true subsurface position. Migration is typically performed on post stack seismic data to reduce the amount of processing time, but even so takes weeks of conventional supercomputer time for even medium size post stack seismic data cubes.

Many types of stacking and migration processes are well known. See, O. Yilmaz. 1987. *Seismic Data Processing*. Tulsa, Okla.: Society of Exploration Geophysicists. Usually, one poststack trace is associated with each bin. However, it is also possible to create multiple poststack traces per bin. For example, each such trace might contain contributions from prestack traces whose source-receiver separation falls within a specific range. (In this case, the bin is said to contain a common depth-point or common midpoint gather.)

Stacking programs create poststack data from prestack data by simple manipulation of prestack data. In general, a stacking program transforms each prestack trace exactly once. Migration programs create poststack data from prestack data by more complicated, computationally intensive, manipulation of the same data. Migration programs transform each prestack trace a large number of times, requiring commensurately more computation than simpler stacking programs. Multiple prestack traces are transformed and added together and superimposed to create the one or more poststack traces associated with a bin.

One such (partial) migration program is "3D Dip Moveout" (DMO) using the Kirchhoff method. See, U.S. Pat. No. 5,198,979 Moorhead et al. See also, S. Deregowski and F. Rocca. 1981. Geometrical optics and wave theory for constant-offset sections in layered media. *Geophysical Prospecting*, 29, 374–387. DMO creates a poststack data set than can be input to another (full) migration program. DMO transforms a prestack trace once for each bin that lies under a line drawn between the seismic source and receiver. This line is referred to as the "coverage" of the trace. The coverage of a trace in another migration program, 3D Kirchhoff prestack depth migration, is substantially larger than that in a DMO program.

Though efficient, the Kirchhoff approach is still computationally expensive. Approximately 30 arithmetic operations (floating-point operations, or FLOPs) are required for each sample of each transformed trace. Given an average shot-receiver separation of 3 kilometers, a bin width of 12.5 meters, and 8 seconds worth of data in each trace acquired at 4 ms/sample, this implies an average of approximately 14.4 million FLOPs per trace. A typical 20 km square marine survey using 12.5 meter wide, 25 meter tall bins contains perhaps 80 million prestack traces. The DMO process using the Kirchhoff approach thus consumes approximately 10 trillion FLOPs. This computational expense motivates the implementation of migration programs such as DMO on some form of high-performance supercomputer, such as a massively parallel processor (MPP) See, Thinking Machines Corporation, 1993. *The Connection Machine CM-5 Technical Summary*. Such a processor is an attractive platform upon which to execute migration programs, because its performance scales up as its size increases; thus, the system can grow incrementally as the computation demand of the processing organization increases. See also, W. Daniel Hillis and Lewis W. Tucker, The CM-5 Connection Machine: A Scalable Supercomputer, *Communications of the ACM*, November 1993, Vol. 36, No. 11, pp 31–40.

Parallel Computation

Figure 1:
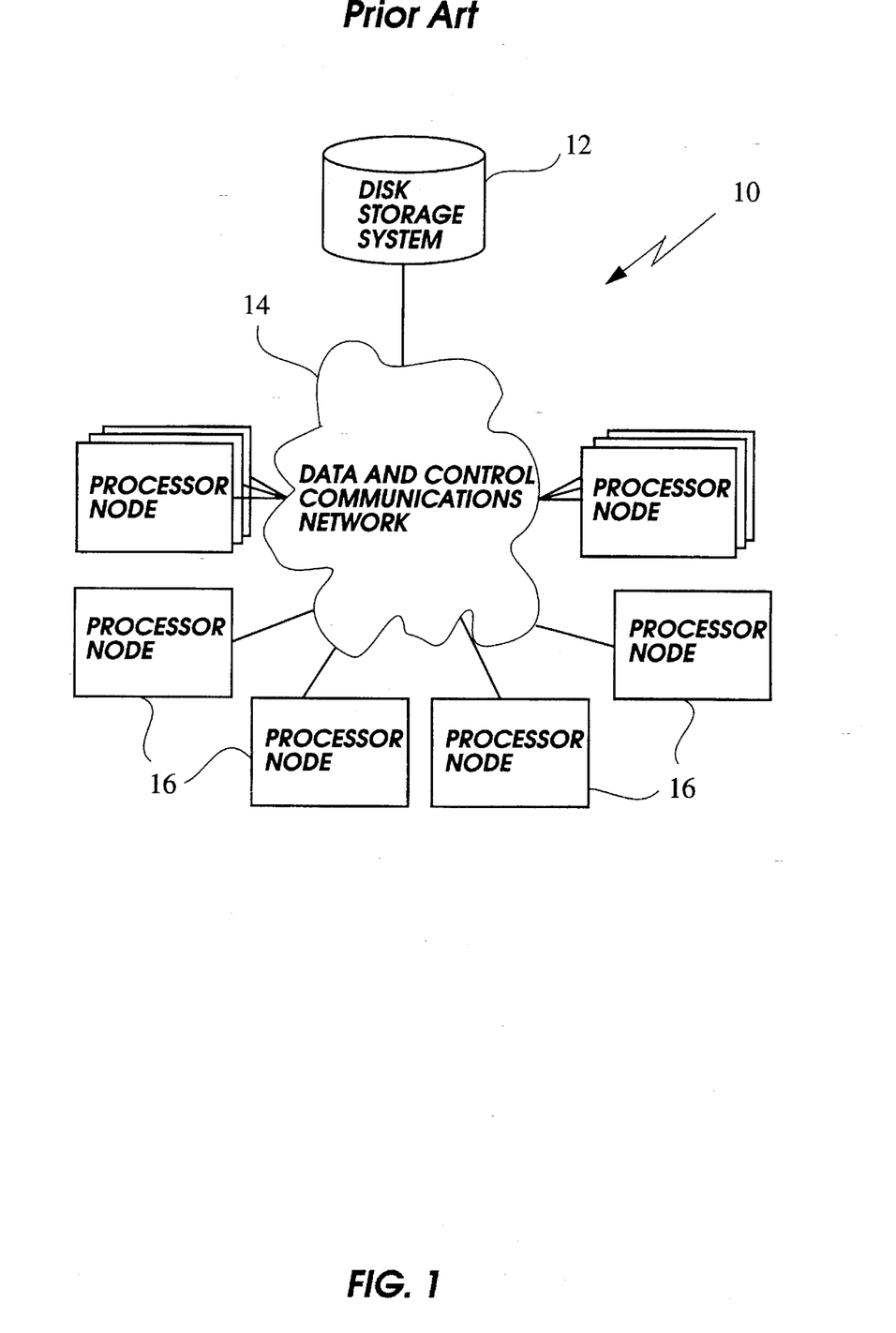
FIG. 1 is a block diagram of the abstract massively parallel processor architecture for performing seismic processing in accordance with the methods of the present invention.

As shown in FIG. 1, an MPP 10 consists of 3 major components: (i) a disk storage system 12 whose capacity and data transfer rate can be scaled up as storage and data throughput requirements demand, (ii) a data and control communications network 14 that tics together the processors and the disk storage system, and (iii) a set of processing nodes 16 (see FIG. 2), each containing at least one processor 18, memory 20, and interface 22 to the data and control network 14. The capacity of the data network 14 (the amount of data it can transport in a given amount of time) scales as the number of processors increases. The size of the set of processing nodes 16 can be scaled up as computation requirements demand. On an MPP, processor nodes 16 can execute independently from one another; however, the control portion of the data and control communications network 14 provides a means by which all nodes 16 can synchronize their activities.

An MPP can improve the performance of computationally-intensive seismic processing such as migration programs, because it is possible to partition the work to be done and assign a part of the work to each processor node 16. For this approach to scale as the size of the MPP scales, the partitions must be truly independent of one another, such that no two processors share work. For example, each bin in the survey area must be assigned to one and only one processor at any one time.

A straightforward partitioning is one that assigns non-overlapping rectangular areas of bins to processors. This satisfies the independence requirement because each bin is independent of other bins. However, many, but not all, bins will be covered by a common prestack trace. Thus, it must be possible to efficiently input the same prestack trace, which is often stored on the disk storage system 12, to multiple processors. Each processor will then transform the trace slightly differently than the other processors, and add it to the developing poststack trace associated with the assigned bin.

Two obvious trace input strategies exist. The first inputs the same prestack trace to all processing nodes 16. In general, this is an inefficient use of an MPP. Often, many nodes 16 that receive the prestack trace are assigned to bins outside that trace's coverage. If a processing node 16 were to receive such a trace, it would simply ignore it and wait until it receives the next trace. The result is inefficient use of an MPP's processors, since many processors can waste time discarding traces.

A second strategy is to determine which traces cover which bins, and input from the disk storage system different traces into different processing nodes 16, such that only traces that cover a processing node's assigned bin is sent to that processor. Although this is efficient from the perspective of processor usage, it can be inefficient from the perspective of disk usage, because it creates contention as different processors attempt to read from different parts of the disk storage system at the same time. If the disk system is implemented as a single logical disk, as in a RAID disk system, see S. J. Lo Verso, M. Isman, A. Nanopoulos, W. Nesheim, E. D. Milne, and R. Wheeler. SFS: A parallel file system for the CM-5. In *Proceedings of the* 1993 *Usenix Conference,* different processing nodes 16 will be contending for control of the disk system 12 (i.e., for control of the placement of the disk heads). This results in delays in moving data from the disk system 12 to processor memory 20.

If, by contrast, the disk system 12 is implemented as multiple disks, then there may be no contention, if each processing node 12 is reading from a separate disk. However, this disk architecture does not scale well. In general, this is implemented as a disk per processor, with fast access to the disk from the processor to which the disk is connected, and significantly slower access to the disk from other processors. See, Kendall Square Research, 1993. *Technical Summary*. In addition, the potential for contention for a single disk exists, if two or more processors try to read from the same disk.

Approaches are developing for applying parallel computation to seismic processing problems. See, U.S. Pat. No. 5,198,979 Moorhead et al. and U.S. Pat. application Ser. No. 07/811,565 Pieprzak et al. (Allowed). In this application, all references to patents are incorporated by reference and all other references are incorporated by reference for background.

SUMMARY OF THE INVENTION

Broadly speaking, the method of the present invention supplies prestack seismic data to the processing nodes of a multiprocessor computer increasing input efficiency and avoiding contention between nodes. Conceptually the processing nodes are divided into input and operator nodes. The prestack seismic data is input to the input nodes, where the data is examined to determine the coverage—preferably spatial coverage—of the data in each input node. Next, each input node broadcasts to the operator nodes a description of its coverage. Each operator node is then assigned an area within the coverage for processing. In the preferred embodiment, the coverage is a bounded region of the earth partitioned into bins and an area is one or more bins. After area assignment, each operator node requests and receives prestack seismic data for its assigned area from the input nodes in possession of the data.

In seismic data processing steps, a primary task is enhancing signal at the expense of noise and shifting the acoustic reflectors to their true geological position. "Stacking" is a key signal enhancement technique and is the averaging of many seismic traces that reflect from common points in the subsurface. Because each trace is assumed to contain the same signal but different random noise, averaging enhances the signal while reducing the noise. As the spacing between the source-receiver pair increases (offset) the two way reflection travel time also increases because the sound has a longer path to travel. "Normal moveout" correction converts every trace to zero offset which for a marine seismic acquisition, must also account for initial speed and streamer position. "Dip Moveout" (DMO) partially migrates dipping events after normal moveout correction to remove the effect caused by source-receiver separation. The full migration processing step that follows further shifts dipping reflectors to nearer their true physical location.

The preferred embodiment of the invention provides a method for efficiently inputting prestack seismic data for Kirchhoff-style prestack migration and DMO programs on MPPs with varying numbers of disks and processors. The preferred method partitions the MPP into a set of "operator" nodes and a set of "input" nodes. Operator nodes are assigned to nonoverlapping subsets of bins of a seismic survey, and apply a migration operator to multiple prestack traces to incrementally create a poststack trace associated with each assigned bin.

In the preferred embodiment of the invention, poststack data associated with bins in the seismic survey is stored in a file on a scalable disk storage system, such as a RAID subsystem. This sort of system can provide large amounts of data to the operator nodes; the data consists of one or more poststack traces per bin. Typically, a given bin will be read from disk, updated, and written out to disk multiple times during the processing of a prestack data set. To achieve high performance, the poststack data is desirably arranged on the file so that read and write requests describe contiguous blocks of file data. The bins assigned to the first operator node must immediately precede those assigned to the second operator node; the bins assigned to the second operator node must immediately precede those assigned to the third, and so on. This guarantees that all of the poststack bins read or written form a contiguous subset of the file.

In the preferred embodiment of the invention, input nodes read prestack trace data from a scalable disk storage system, such as a RAID subsystem. This sort of system can efficiently supply large amounts of data to the input nodes; the data consists of a large, contiguous, block of prestack traces, and is equally divided into a number of smaller blocks, one smaller block into the memory of each input node. Alternatively, the prestack data can be read into the MPP using a high-speed connection to an external data network, such as a HiPPI network. The only requirement is that each contiguous block of data read into the MPP is distributed across the input nodes' memories.

Each time a block of prestack data is read into the input nodes, the input nodes determine the union of the spatial coverage of each of the prestack traces they contain. When performing 3D DMO See, S. Deregowski and F. Rocca. 1981. Geometrical optics and wave theory for constant-offset sections in layered media. *Geophysical Prospecting,* 29, 374–387.) an individual trace's coverage is a line between the source and receiver. When performing "Saddle" DMO an individual trace's coverage is an ellipse, one of whose axes is the line between the source and receiver. See., Meinardus and Schleicher, 3-D time-variant dip moveout by the f-k method, in *Geophysics,* Vol. 58 No. 7, July, 1993. When performing 3D Kirchhoff depth migration, the coverage is potentially the entire survey.

The union of the spatial coverage of the traces in each input node is one or more irregularly-shaped polygons constructed of bins. Once the input nodes have calculated this union, each input node broadcasts to all other nodes a compact description of this coverage. Each node that receives this broadcast unions the description into an initially empty coverage description. After all input nodes have broadcast a description of the coverage of the traces they hold, and all such broadcasts have been received by all nodes, all nodes possess a description of the union of the coverages of all traces in all input nodes. This coverage description is referred to as the "coalesced" description.

All operator nodes retain the coalesced coverage description and the individual coverage descriptions from each input node. The coalesced description provides the operator nodes with a means to determine which poststack bins must be updated by the traces held in the input nodes' memories. As previously stated, operator nodes must move contiguous sets of bins between the poststack data file and their memories. The simplest means of achieving this is to organize the poststack data file as an array whose shape matches that of the seismic survey. If this is done, then given a coalesced description of bins to be updated, the operator nodes simply choose multiple sets of contiguous subsets of bins from the survey. Each contiguous subset of bins therefore corresponds to a contiguous subset of the file.

Operator nodes assign themselves to bins from each contiguous subset of bins according to a uniform decision procedure; for example, if a contiguous subset of bins consists of a rectangle of 128 columns and 8 rows, and there are 32 operator nodes, then each operator node can assign itself to a 4 column by 8 row rectangle. The first operator node assigns itself to the left most 4 by 8 rectangle, the next operator node assigns itself to the second 4 by 8 rectangle, and so on. If there are more operator nodes than there are rectangles of bins, some operator nodes remain unassigned and do no migration processing. If there are fewer nodes than rectangles of bins, then the remaining rectangles of bins will be processed in a later round of operator to bin assignments.

Each time an operator assigns itself to a set of bins, it loads into its memory the poststack traces associated with the bins from the poststack data file. It then retrieves a set of prestack traces from one or more input nodes, applies the DMO operator to them, and updates the poststack traces in its memory. If there are more prestack traces to retrieve, the operator repeats the process. When all prestack traces that cover the operator's bin assignment have been processed, the operator write its updated poststack traces back to the poststack data file.

The individual coverage descriptions broadcast by the input nodes provide the means by which the operator nodes determine from which input nodes to retrieve prestack traces. An operator node queries a coverage description to discover if a particular input node holds prestack traces that cover the operator's bin assignment. If that input node does, then the operator requests traces from it.

The simplest of coverage descriptions contains only enough information for an operator to determine whether there are traces that cover a particular bin; in this case, the operator cannot determine how many traces cover the bin a priori. Each input node keeps track of which traces have been sent to which operator nodes, so that each node receives a given trace only once. In the trace request to the input node, the operator supplies a maximum number of traces it is willing to accept. If the input node returns fewer than this number of traces, the operator concludes that it has retrieved all relevant traces from the operator and continues requesting traces from the next input node. When all input nodes have been queried in this manner, the operator is done processing prestack traces its the current bin assignment.

A more detailed coverage description includes the number of traces that cover each bin. This allows an operator node to know a priori how many traces it will receive from an input node when processing the set of bins to which it is assigned. The advantage of this technique is that it allows the operator nodes to determine bin processing assignments that approximately equalize the amount of work each one performs, based on the number of traces that cover each bin. Thus, operator nodes that would ordinarily be assigned to low coverage areas of the survey, usually at the edges of the survey, can allocate themselves to more bins, and operator nodes assigned to high coverage areas in the interior of a survey can allocate themselves fewer bins.

DETAILED DESCRIPTION

In the preferred embodiment of the present invention, methods are provided for supplying prestack input data to processing nodes on a massively parallel processor (MPP) for performing seismic processing, such as a "3D Dip Moveout" or "Kirchhoff" migration.

MPP Overview

FIG. 1 depicts an abstract MPP architecture compatible with the methods of the present invention. The exact details of the data and control communications network are unimportant. In accordance with the methods of the present invention, the communications network 14 need only support the exchange of arbitrary messages between any two processor nodes 16, the ability of any one processor node 16 to broadcast an arbitrary message to all other nodes 16, and the ability of all nodes 16 to synchronize their activities when necessary. Under the preferred embodiment of the invention, the data network 14 should support the transfer of at least 5 megabytes of data per second for each node 16 in the MPP 10. For example, an MPP containing 32 nodes should support at least 160 megabytes/second of aggregate data throughput.

Figure 2:
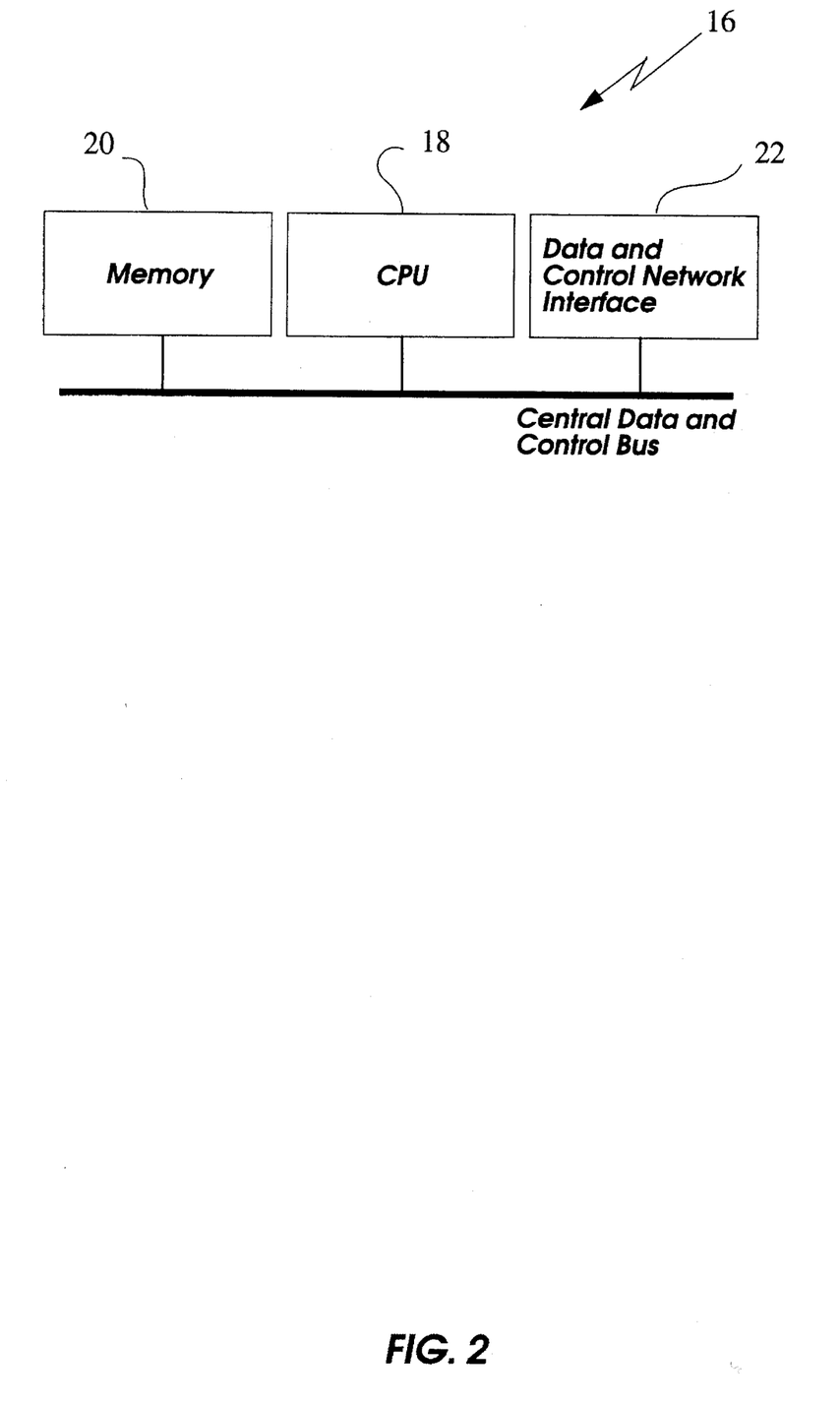
FIG. 2 is a block diagram depicting the abstract architecture of a processor node in an MPP used for performing partial or full migration in accordance with the methods of the present invention.

FIG. 2 depicts an abstract MPP processing node 16 compatible with the methods of the present invention. Once again, the exact details are unimportant. In the preferred embodiment of the invention, the node 16 should contain at least 16 megabytes of local random access memory 20, and is capable of transmitting and receiving data over the interface 22 to the data communications network 14 at a rate of at least 5 megabytes/second. The CPU 18 can in fact comprise a number of processors.

The preferred embodiment of the invention employs an MPP architecture whose performance scales nearly linearly as the number of processors, amount of memory 20 on each node 16, and size of the disk storage system 12 are increased commensurately. This requires the throughput of the data and control network 14 to scale linearly with the number of processors (number of nodes 16 and number of processors comprising CPU 18 within a node), since more processors will exchange more data using the network 14. It further requires the throughput of the disk storage system 12 to scale with the number of processors, since more processors will attempt to read more data at the same data rate. By implication, this also requires the capacity of the disk storage system 12 to scale with the number of processors.

A disk storage system architecture that meets this requirement is a disk array, sometimes called a "RAID" architecture, in which a number of usually inexpensive disks are made to appear as a single file system. See, S. J. Lo Verso, M. Isman, A. Nanopoulos, W. Nesheim, E. D. Milne, and R. Wheeler. SFS: A parallel file system for the CM-5. In *Proceedings of the* 1993 *Usenix Conference.* Employing a RAID architecture is in itself insufficient to guarantee scalability. The disk storage system must be used in a scalable manner. In general, this requires disk read and write operations to be both synchronized in time and localized over the disk surface, such that each disk is reading or writing from the same place at the same time.

One such MPP that satisfies these requirements is the Connection Machine model CM-5, manufactured by Thinking Machines Corporation of Cambridge, Mass., employing a DataVault or Scalable Disk Array as a disk storage system 12. The I/O system allows any group of nodes 16 to read a block of data from the disk storage system 12, or write a block of data to the disk storage system 12, subject to the constraint that the data block represents a contiguous subset of a file. The block is read into or written from the memories of the group of nodes. The first part of the block is read into or written from the first node in the group; the second part of the block is read into or written from the second node in the group (if there is one). Each succeeding part of the block is read into or written from each succeeding node in the group through the last node in the group.

It should be understood that other multiprocessor computer architectures and other disk storage system architectures that either require or allow a contiguous block of data to be read into or written from a group of nodes 16 of a multiprocessor computer can also be employed without departing from the scope of the present invention.

Seismic Acquisition

Figure 3:
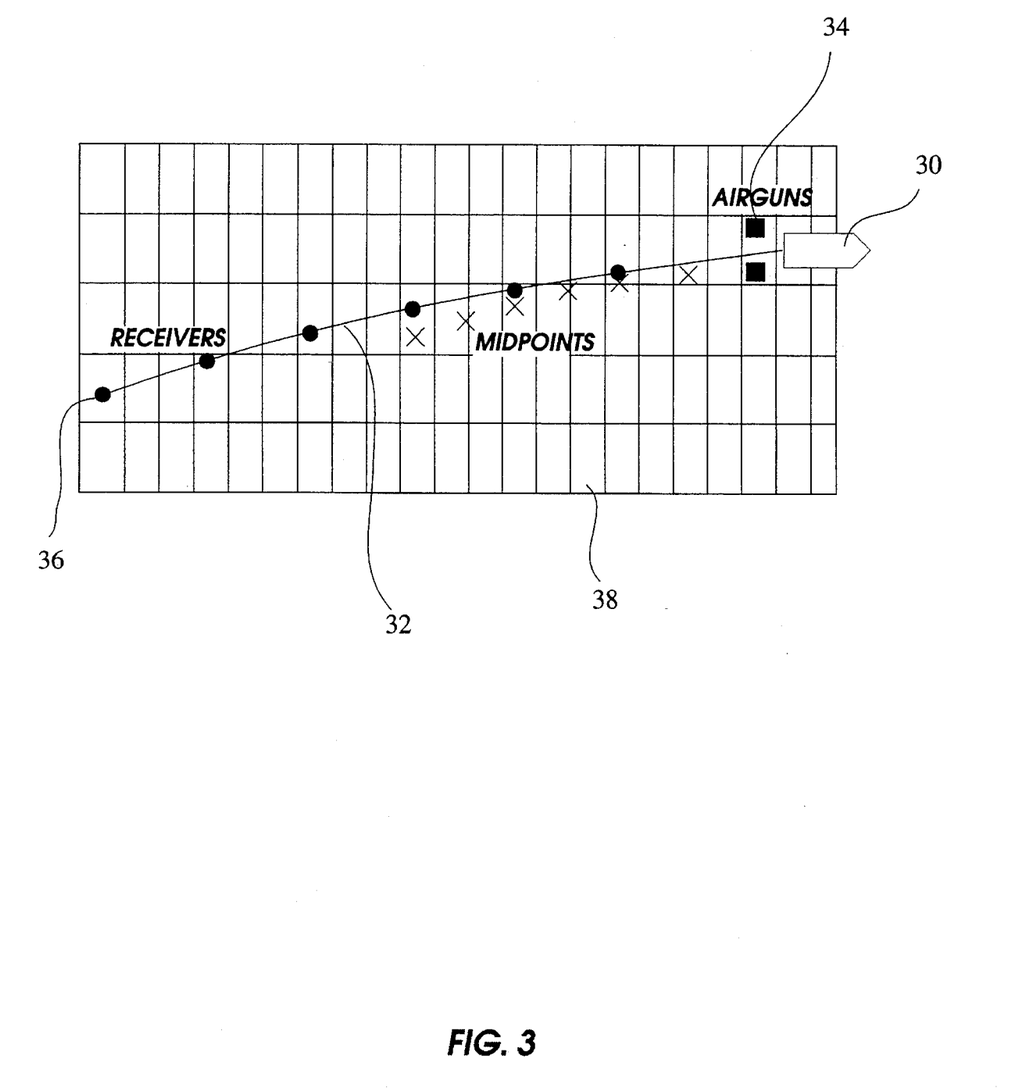
FIG. 3 is a simplified depiction of marine seismic data acquisition.
Figure 4:
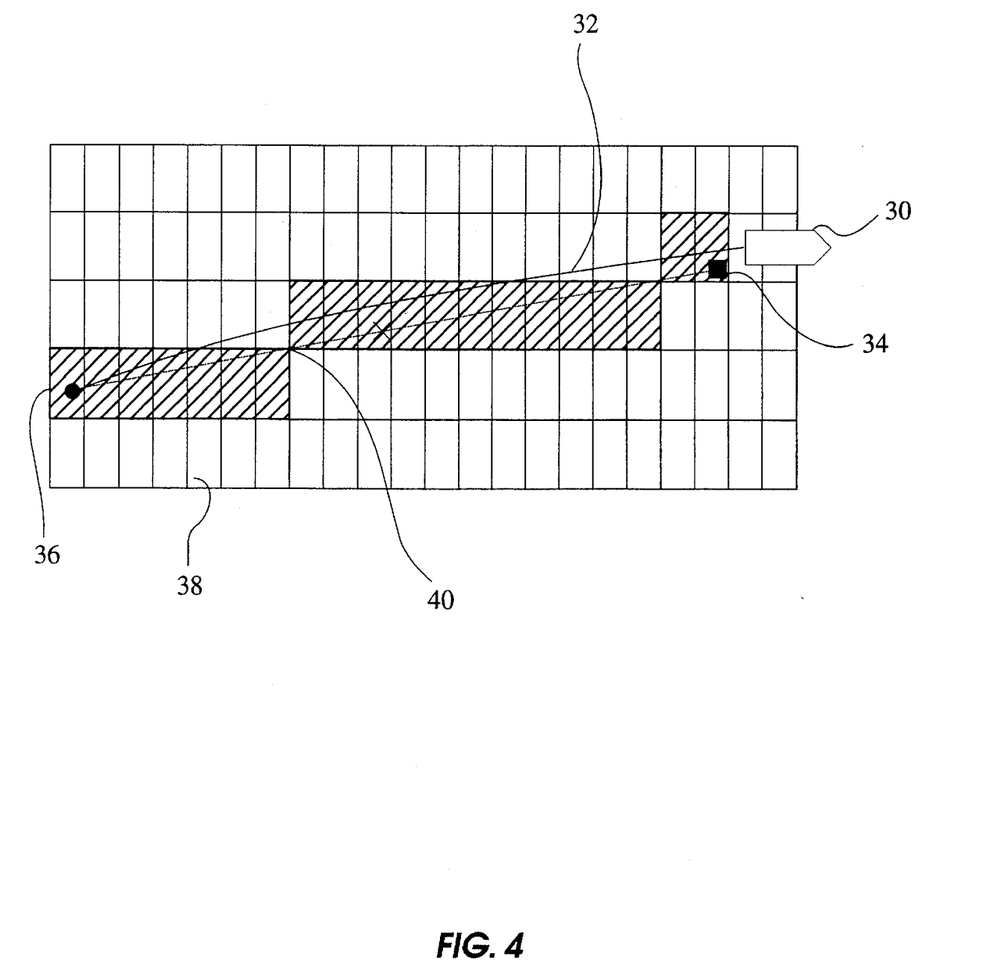
FIG. 4 illustrates the bin coverage of the "far-offset" trace in the survey depicted by FIG. 3.

As previously noted, the advantage inherent in using an MPP when performing seismic migration is the potential for significantly reducing the amount of time required to process the prestack data. FIG. 3 shows a simplified marine seismic data acquisition scenario. In actual contemporary practice, a seismic acquisition vessel can tow two streamers 32, which can be up to 5 kilometers in length. Typically a source or airgun array 34 operates in conjunction with a streamer 32 having up to 240 receivers 36 (hydrophones). In addition, survey vessels 30 often operate in pairs, one vessel 30 firing seismic sources 34, and both vessels recording the resulting echoes at the receivers 34. The area over which the seismic survey is conducted is partitioned into bins, as shown in FIG. 3. Each trace recorded during a survey crosses a number of bins 38. During migration, a prestack trace is processed by application of a mathematical operator once for every bin 38 under the trace's "coverage," and superimposed with other traces processed into the same bin. For example, the coverage of a trace in a 3D Dip Moveout program is a line between the seismic source 34 and trailing receiver 36, as depicted in FIG. 4. In practice, such a "far offset" trace may cross 400 such bins 38, and an average trace may cross 240 bins. Contemporary seismic surveys can contain 80 million traces, or approximately 800 gigabytes of data; furthermore, the size of surveys is increasing every year.

Allocation of Bins

Figure 5:
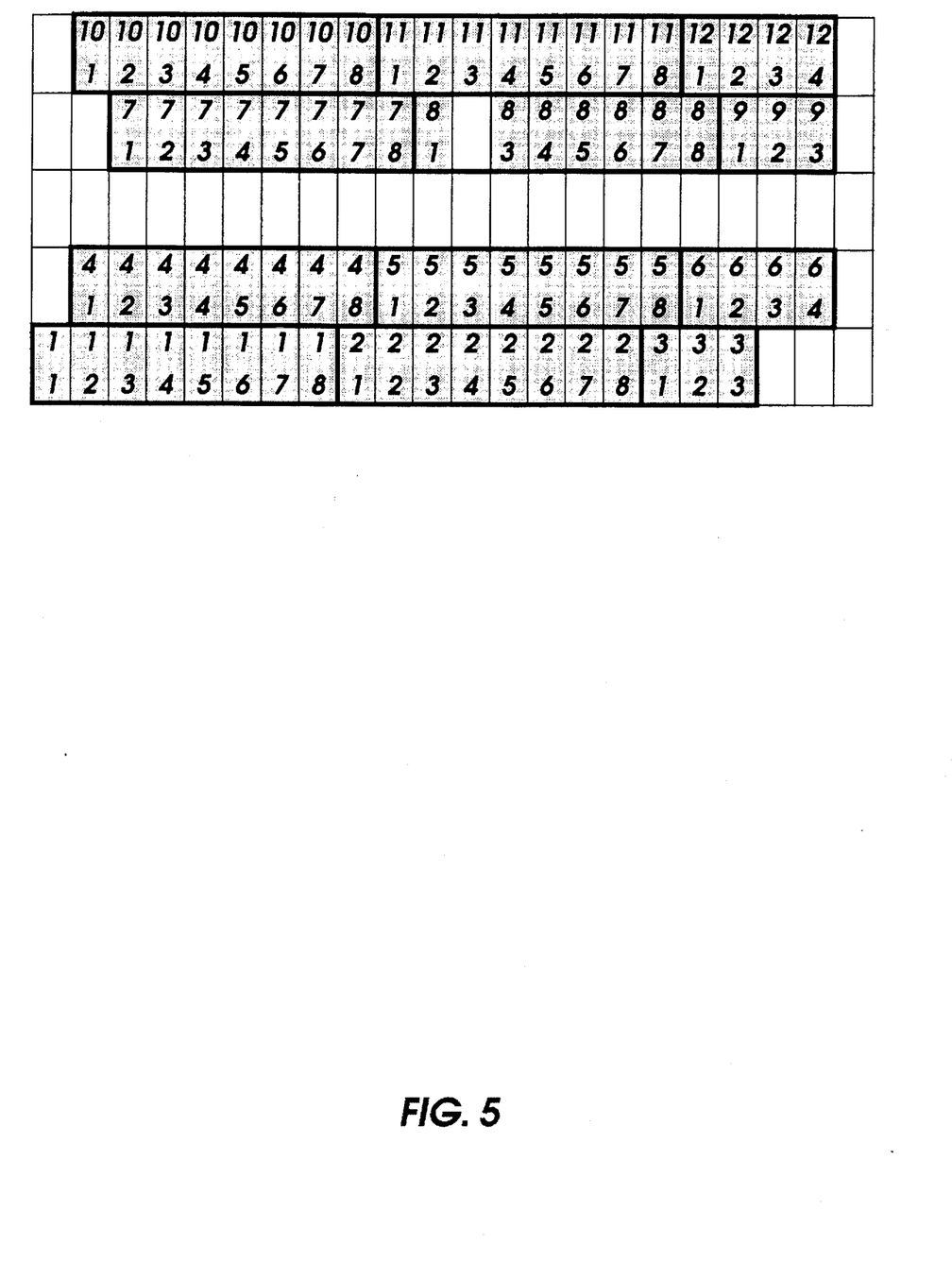
FIG. 5 is a graph describing an assignment of bins to operator nodes in accordance with the methods of the present invention.

For an MPP to significantly reduce the time required to migrate a prestack seismic data set, a means must be found to decompose the migration task into a number of independent tasks, one per processing node 16. The preferred embodiment decomposes the seismic survey area into a number of smaller areas, each of which is assigned to a node in the MPP. FIG. 5 depicts an assignment of nodes 16 to bins 38. Although for simplicity, FIG. 5 shows one bin 38 assigned to each node 16 at any given time, in the preferred embodiment, significantly more bins 38 are assigned to a node 16 at any one time. In practice, rectangular areas or groups of from 32 to 1600 bins can be assigned to a node 16, depending on the amount of memory 20 present in the node and the total size of the seismic survey. Alternatively, one can interpret each bin depicted in FIG. 5 as representing such a rectangular area or group of bins.

In FIG. 5, each separate assignment of nodes 16 to bins 38 is a contiguous subset of the seismic survey area. This is not strictly required by the methods of the present invention, however, under the preferred embodiment of the invention, this contiguity of bins can allow for efficient transfer of poststack data between the memories of the nodes and a data file resident on the disk storage system, for the same reasons discussed previously with regard to prestack data.

The contiguity also allows for a simple algorithm to determine bin-node assignment. In FIG. 5, each bin assignment consists of two numbers. The bottom number is the index of the node assigned to the bin—or in general, to an area or group of bins—in the set of processing nodes dedicated to seismic processing. Since these nodes execute the migration "operator," they are referred to as "operator" nodes. Given a set of O operator nodes, the nodes are indexed from 1 to O. The upper number indicates which of the potentially many assignments of operator nodes to bins is currently active. When there are more bins 38, or more areas or groups of bins, than there are operator nodes, each operator node will have to process data for one or more bins or areas or groups of bins. FIG. 5 depicts 12 such assignments of 8 nodes. Note that if a row contains a gap that is smaller than the number of nodes, it is possible to assign bins to the left and to the right of the gap at the same time.

Although under the methods of the present invention, each operator node is assigned to an independent set of bins covering the survey, the bins may not be independent of which prestack data traces are required to correctly form the poststack traces associated with the bins 38. Consider a seismic acquisition survey such as depicted in FIG. 3 and a bin assignment such as depicted in FIG. 5. It is clear that any single prestack trace (e.g., line 40 in FIG. 4) may be needed by multiple processors.

Figure 6:
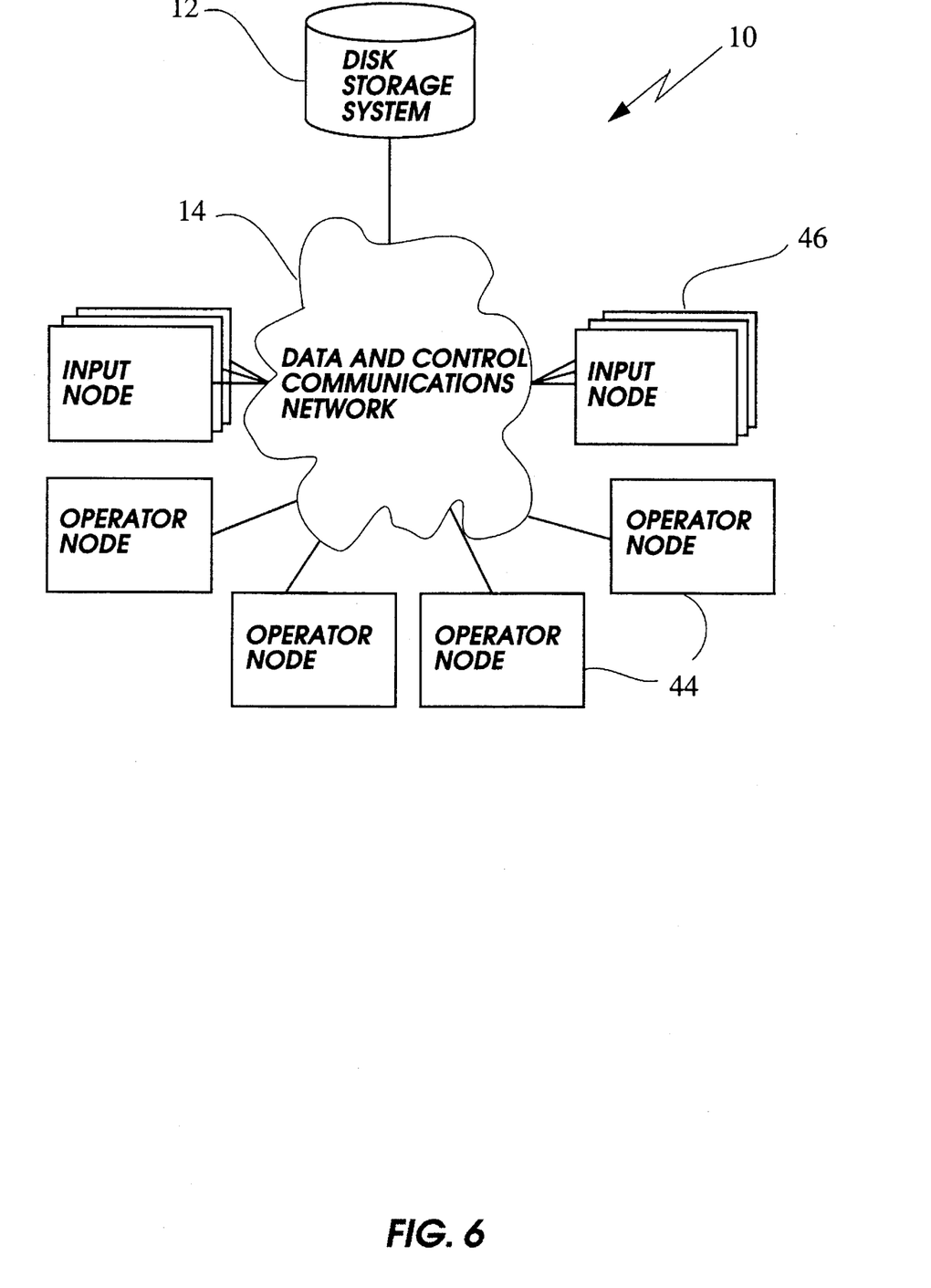
FIG. 6 is a block diagram illustrating the abstract massively parallel processor architecture of FIG. 1 as it is used according to the methods of the present invention.

The present invention provides such prestack trace data to operator nodes. The method of the present invention partitions the MPP 10 into a set of "operator" nodes 44 and a set of "input" nodes 46, as depicted in FIG. 6. Operator nodes 44 are assigned to nonoverlapping subsets of bins 38 of a seismic survey, as described previously. Operator nodes 44 apply a migration operator to multiple prestack traces to incrementally create a poststack trace associated with each assigned bin.

Processing of Data

In the preferred embodiment of the invention, input nodes 46 read data from a scalable disk storage system 12, such as a RAID subsystem. This sort of system can efficiently supply large amounts of data to the input nodes; the data consists of a large, contiguous, block of prestack traces, and is equally divided into a number of smaller blocks, one smaller block into the memory 20 of each input node 46. Alternatively, the prestack data can be read directly into the MPP 10 using a connection to an external data network, such as a HiPPI network. A major feature of the methods of the present invention is that each contiguous block of data read into the MPP 10 is distributed across the input nodes' memories. The input nodes 46 read trace data in sequential, contiguous, blocks. Each block contains an integral number of traces, and each input node 46 reads an integral number of blocks into its memory 20 at one time. This type of read is efficient, as it causes no contention for control of the disk storage system 12 among the input nodes 46.

Figure 7:
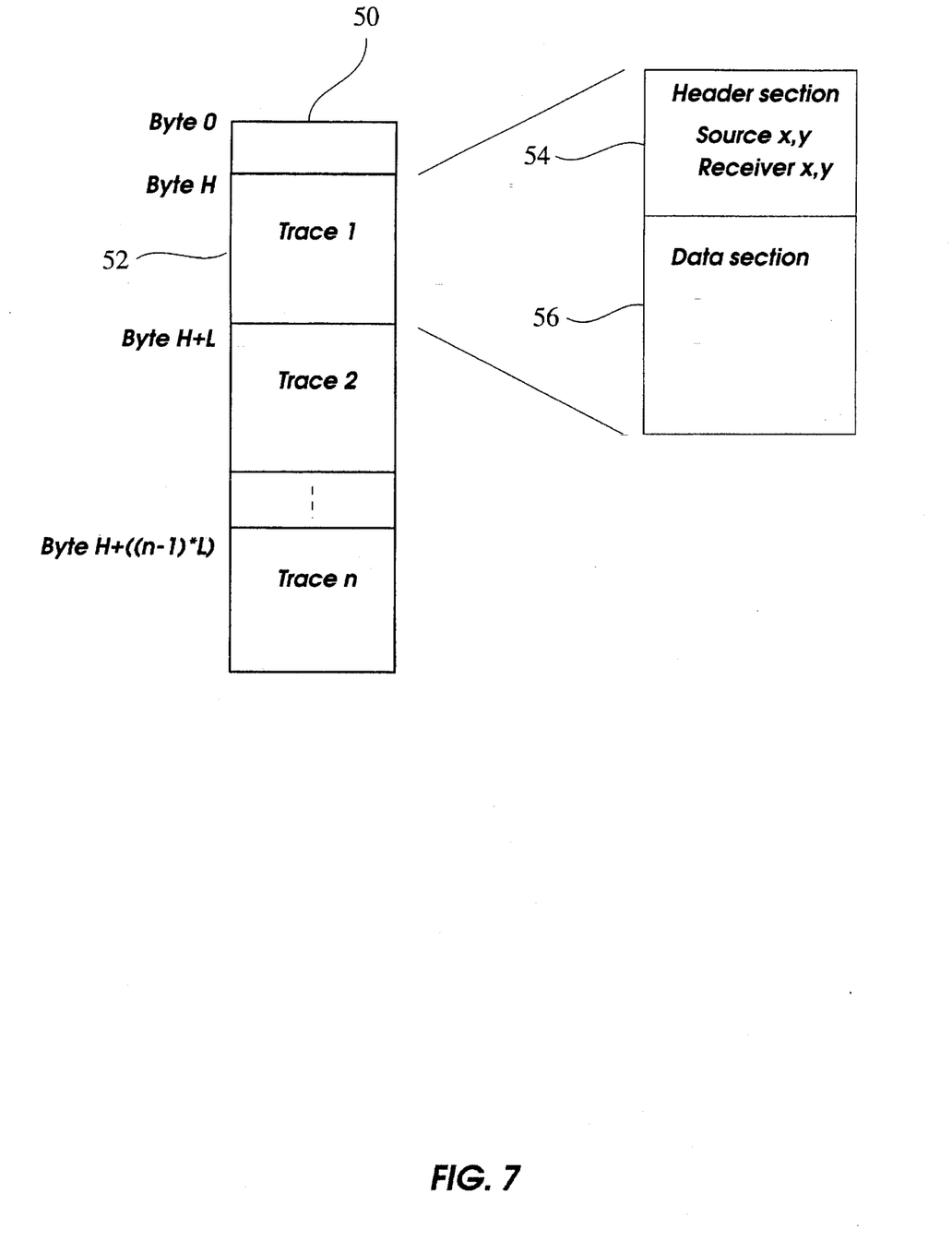
FIG. 7 depicts the linear format of a prestack data file of a block of traces used as input.

FIG. 7 depicts such a block 50 of n prestack traces 52. Each trace consists of a header section 54 and a data section 56. The data section contains the data to be processed or migrated. The header section 54 contains information that, among other pieces of information, identifies the location of the seismic source and receiver for the associated data.

Figure 8:
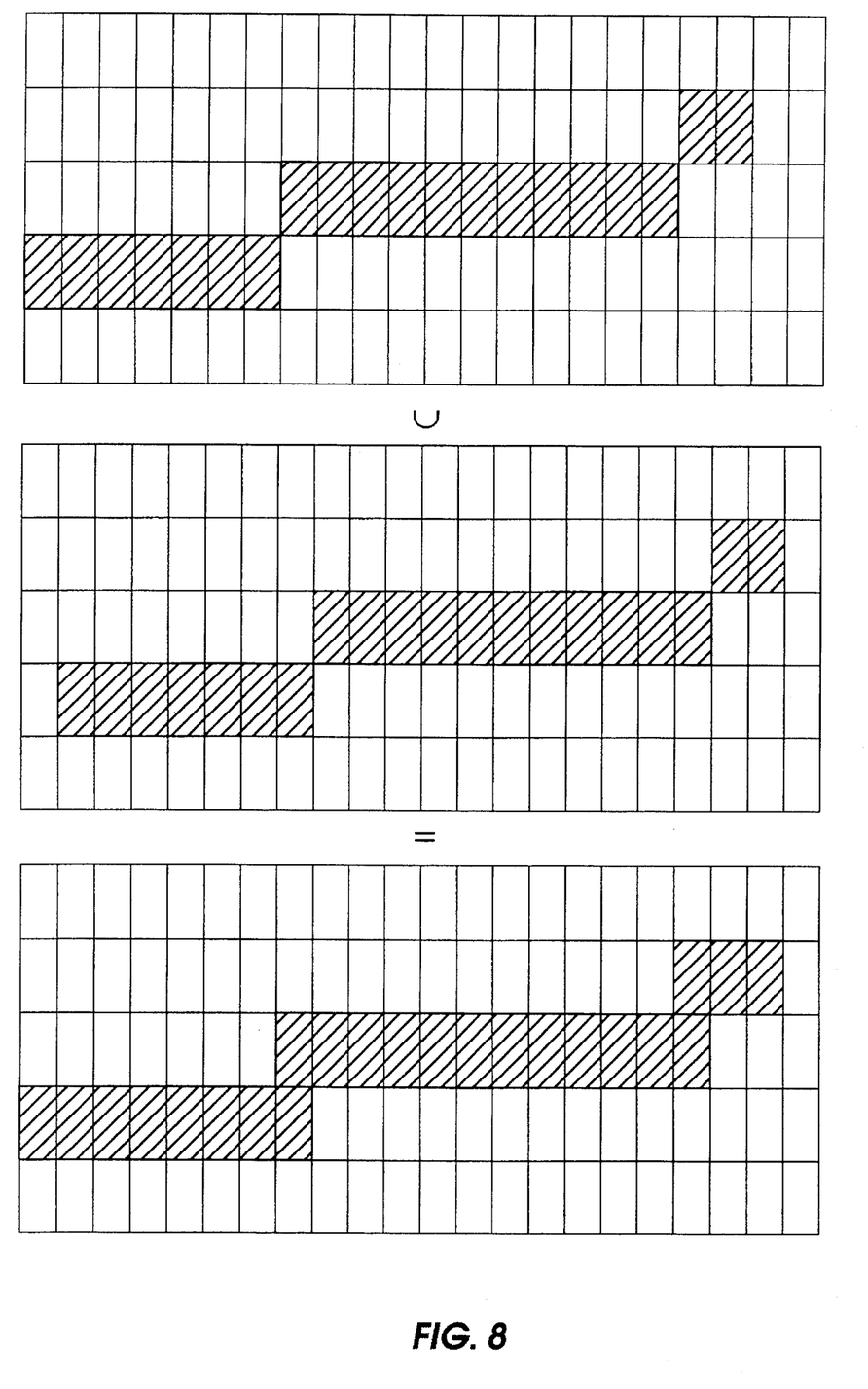
FIG. 8 is three graphs illustrating the operation of computing the union of two trace coverage descriptions.

Each time a block 50 of prestack data is read into the input nodes 46, the following steps are taken:

1. The input nodes 46 determine the union of the spatial coverage of each of the prestack traces 52 they contain. The union of the spatial coverage of the traces in each input node 46 is one or more irregularly-shaped polygons constructed of bin 38. For example, FIG. 8 depicts the union operation for two prestack trace coverage descriptions. It is clear that any number of such trace coverage descriptions can be unioned together, and that doing so will create an irregular polygon of bins.

2. Once the input nodes 46 have calculated this union, each input node 46 broadcasts to all other nodes (44, 46) a compact description of this union of coverage. Input node 0 broadcasts first, input node 1 second, and so on, until input node I-1 has sent its broadcast. The data and control communications network 14 ensures that these broadcasts are received in order.

Figure 9:
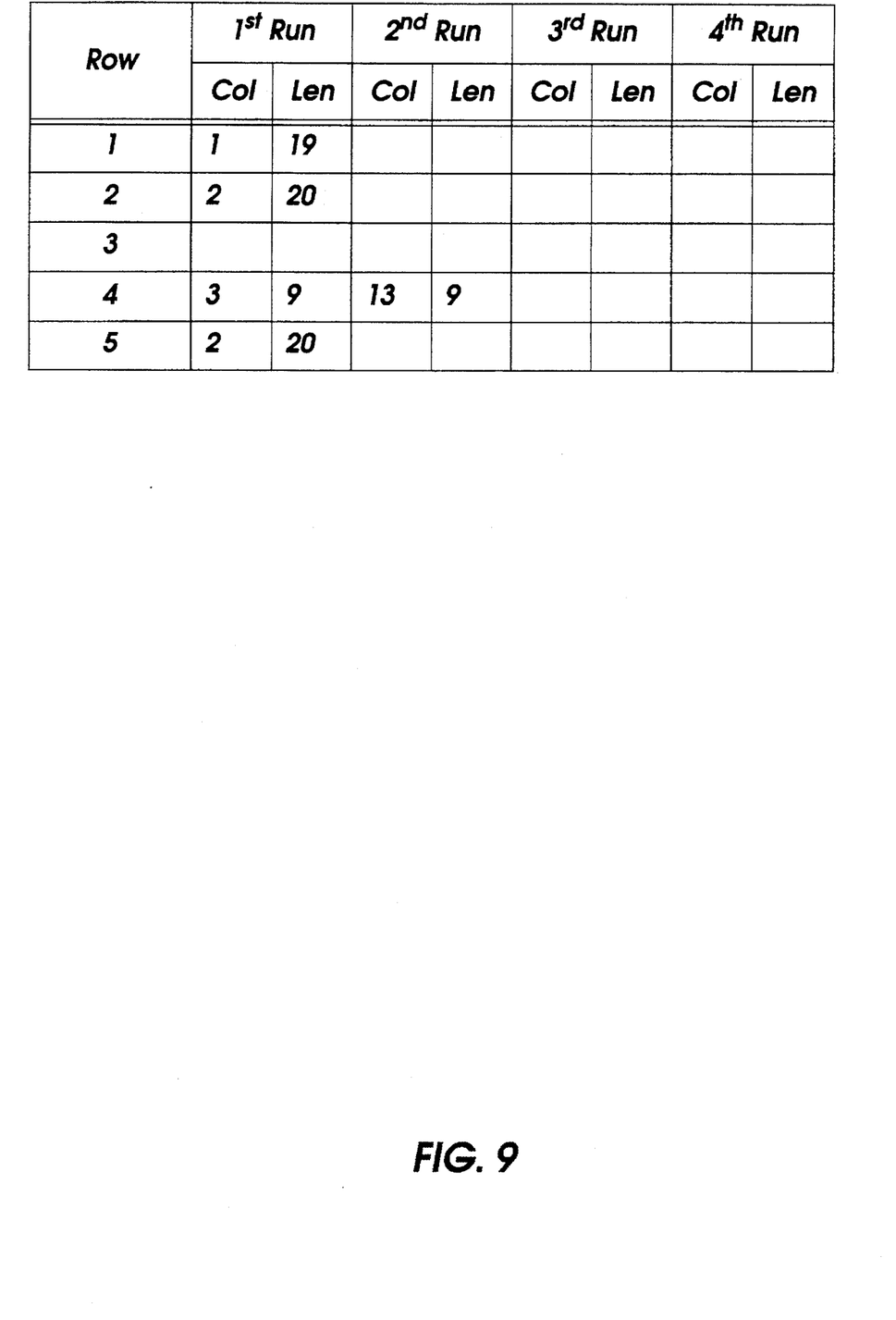
FIG. 9 is a table depicting a compact coverage description, in this case a tabular form of run-length encoding, corresponding to the coverage depicted in FIG. 5.

The description that is broadcast can be in any form, so long as from it, the receiving node (44, 46) can determine which bins are covered. A possible form is a 2D array of boolean values, having the same shape as the ultimate survey (as exemplified by FIG. 5), where true elements in the array signify covered bins 38 or groups of bins, and false elements signify noncovered bins. Because this array is likely to contain only sparse coverage, the preferred embodiment of this description is a "sparse matrix." FIG. 9 depicts one possible sparse matrix representation, as a table of run-length encodings of covered bins in each row. It should be understood that other representations are possible and are within the scope of the present invention.

Each node (44, 46) that receives this broadcast unions the description into an initially empty coverage description, which ultimately will hold the coalesced coverage description. After all input nodes 46 have broadcast a description of the coverage of the traces 52 they hold, and all such broadcasts have been received by all nodes (44, 46), all nodes possess a coalesced description of the union of the coverages of all traces in all input nodes 46. The coalesced description corresponds to the shaded area in FIG. 5. Operator nodes 44 also store each input node's broadcast in a table indexed by the input node's number.

3. After all input nodes 46 have broadcast a description of the coverage of the union of traces they have loaded, and all nodes have received these broadcasts, then all nodes possess the coalesced description of the coverage of all traces loaded into the memories 20 of all input nodes (44, 46). Front this information, it is possible for all operator nodes 44 to independently choose their bin assignments. One such assignment of bins 38 to operator nodes 44 is determined as follows:

a. All operator nodes 44 assign themselves to a rectangular array of bins. The number of rows y in the array is the same across all operator nodes. The number of columns in the array may vary, but only if each operator node 44 knows a priori how many columns every other operator node 44 will assign itself, or has the means to determine this information on its own. One simple strategy is to assume that all operator nodes 44 assign themselves to the same number of columns x.

b. The first operator node (operator node 0) assigns itself to a rectangular array of bins 38 whose lower left corner coincides with the left most, lowest covered bin in the overall trace coverage. Assume the lower left corner of the assignment is bin $(x_0, Y_0)$. If all operator nodes 44 assign themselves x columns, then the upper left corner of operator node O's assignment covers bin $(x_0+x-1, y_0+y-1)$.

c. Each remaining operator node 44 assigns itself to rectangular array of bins that is located immediately to the right of the array assigned to the operator node with the index one less than its own. For example, if all operator nodes 44 assign themselves to x columns, then operator node 1's assignment covers a rectangular array of bins whose lower-left corner is $(x_0+x, Y_0)$ and whose upper left corner is $(x_0+2x-1, y_0+y-1)$. In general, an operator node 44 whose index is i will be assigned corners $(x_0+ix, Y_0)$ and $(x_0+(i+1)x-1, y_0+y-1)$.

d. Some operator nodes 44 may be assigned to rectangular arrays of bins that are not completely covered by traces. These operator nodes 44 have less work to do than other operator nodes. Some operator nodes may be assigned to rectangular arrays of bins that are not at all covered by traces. These operator nodes have no work to do. (Work here is defined as applying the DMO operator to create poststack traces from prestack traces.)

Figure 10:
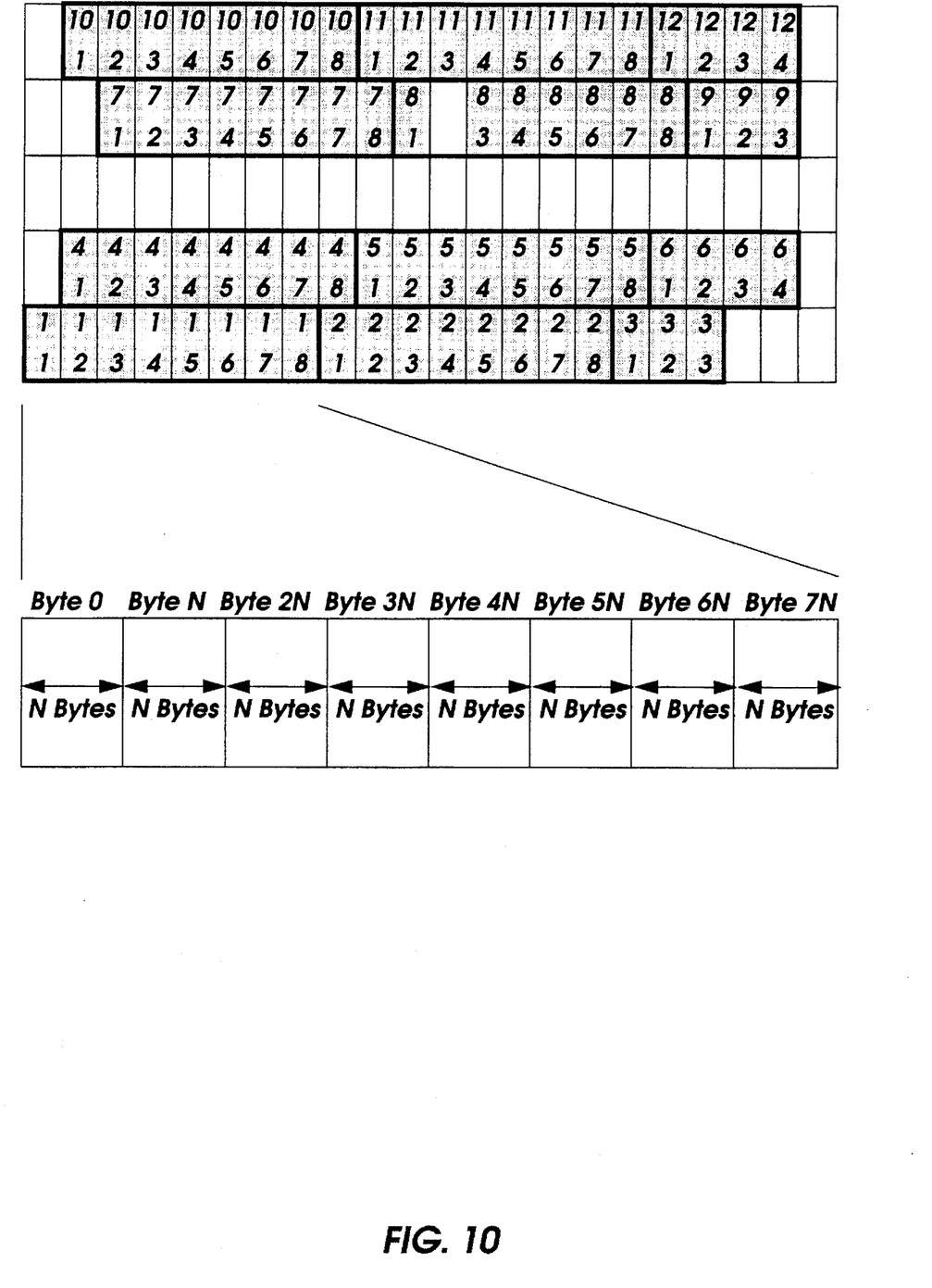
FIG. 10 is a graph of a potential mapping of bins to locations in a poststack data file in accordance with the preferred embodiment of the invention.

It should be understood that other assignments of bins 38 to nodes are possible. Under the preferred embodiment of the invention, the bins assigned to any one operator node 44 are stored in a contiguous subset of the poststack data file, and the union of all such subsets is itself a contiguous subset of the poststack data file, as illustrated in FIG. 10.

4. After an operator node 44 assigns itself to a set of bins, as described in Step 3, it loads into its memory 20 the poststack traces associated with the bins from the poststack data file.

5. After all operator nodes 44 have determined to which bins they are assigned, and all have loaded the poststack traces associated with those bins, the operator nodes 44 can start to request prestack trace data from the input nodes 46. The previously-stored per-input-node coverage information (from Step 2, above) helps the operator nodes 44 choose input nodes 46 to which to send trace requests: An operator node 44 sends trace requests only to those input nodes 46 that hold traces whose coverage intersects the operator's bin assignment.

6. Each operator node's request to an input node 46 for prestack traces 52 includes a description of its assigned bins and the maximum number of the traces the operator node 44 is willing to receive. The operator node has no a priori knowledge of the number of traces the input node 46 holds that intersect the operator node's bin assignment. If the operator node 44 receives the number of traces it indicated it was willing to receive, it asks the same input node 46 for more traces. The input node 46 keeps track of the traces it has sent to the operator node, so that it never sends the same trace more than once for the same bin assignment description.

If an operator node 44 ever receives fewer than the maximum number of traces it indicated it was willing to receive, it must conclude that the input node to which it sent the trace request has supplied all of the traces whose coverages intersect with the bin assignment. At this point, the operator node can send a trace request to the next input node 46 that holds traces whose coverages intersect its bin assignment.

7. Operator nodes 44 can process the received trace data as appropriate. In some cases, they may process a small number at a time (e.g., each time they receive traces from a input node); in other cases, they may wait until all traces have been received from all input nodes, and then process the traces. Clearly, any policy between these two extremes is possible under the methods of the present invention.

8. After all prestack data has been processed by the operator nodes, the above process may repeat. If the union of the bin assignments of the operator nodes forms a subset of the bins covered overall by the trace data in all input nodes, then steps 3–7 can be repeated as needed. Each time, the lower-left corner of the bin assignment for the first operator node is the first unprocessed bin that follows that last bin processed by the last operator node in the previous assignment. If there are covered bins starting at the same row $y_0$ (or between $y_0$ and $y_0+y-1$), then $x_0$ is simply incremented by Ox. If no covered bins remain to the right of the previous bin assignment, then $(x_o, y_o)$ is chosen as in step 3b, but the search for a row containing covered bins begins y rows above the row at which the previous $y_o$ was found.

9. Steps 3–8 are repeated until no covered bins that have not been assigned and had prestack data processed into them remain.

10. Steps 1–9 are repeated for the next block of input data from the file on the disk storage system, until all data in the file has been processed. These steps can be repeated for additional files, as well.

I claim:

1. A method of supplying prestack seismic input data to the processing nodes of a multiprocessor computer, comprising the steps of:

a) dividing the processing nodes into a plurality of input and operator nodes;

b) inputting unique prestack seismic data into respective input nodes, at least some of the prestack seismic data being available for input before all of said prestack seismic data is sorted and available for input;

c) examining the prestack seismic data to determine a unique spatial coverage of the seismic data contained in each input node;

d) each input node broadcasting to the operator nodes a description of its unique spatial coverage;

e) assigning areas within said unique spatial coverage to each operator node;

f) each operator node requesting and receiving unique prestack seismic data for an assigned area from an input node in possession of the corresponding unique seismic data; and g) processing the received prestack seismic data.

2. The method of claim 1, repeating steps b)–g) until no prestack seismic data remains for processing.

3. The method of claim 1, wherein the multiprocessor computer is a massively parallel processor computer.

4. The method of claim 1, wherein said processing step g) includes each operator node processing its received prestack seismic data.

5. The method of claim 1, said unique spatial coverage comprising a bounded region of the earth partitioned into an array of bins.

6. The method of claim 5, said areas comprising one or more bins within said coverage.

7. The method of claim 5, said assigning step e) comprising sequentially assigning an operator node an area spatially contiguous to a preceding assigned area.

8. The method of claim 7, wherein the bins are rectangular and each operator node is assigned an array of bins having the same number of rows.

9. The method of claim 7, wherein the bins are rectangular and each operator node is assigned an array of bins having the same number of columns.

10. The method of claim 1, said inputting step b) including the substep of reading prestack trace data from a scalable disk storage system.

11. The method of claim 10, said reading substep including reading small blocks of prestack trace data into random access memory of each input node.

12. The method of claim 1, the prestack seismic input data comprising prestack trace data assigned to a spatial coverage, said examining step c) including the substep of each input node determining the union of the spatial coverage contained within said input node.

13. The method of claim 1, said broadcasting step d) including the substep of each input node broadcasting a description of its coverage to the other input nodes.

14. A system for processing prestack seismic data comprising:

a multiprocessor computer having a plurality of processing means, each processing means having random access memory and at least one microprocessor;

a scalable disk storage system containing the prestack seismic data; and a data and control communications network interconnecting the processing means and the disk storage system to the computer;

said processing means having input and operator nodes, said input nodes for—reading prestack seismic data into random access memory, at least some of the prestack seismic data being read non-sequentially, determining the unique spatial coverage of the seismic data in a respective input node, and communicating said unique spatial coverage through the communications network to said operator nodes, each operator node being assignable to an area of coverage for—requesting and receiving unique seismic data from input nodes having data responsive to said area of unique spatial coverage, and for processing the received unique seismic data.

15. The method of claim 14, the unique spatial coverage of each input node comprising a bounded region of the earth partitioned into an array of bins containing said seismic data.

16. The method of claim 15, the area of coverage assigned to each operator node comprising seismic data from a plurality of input nodes.

* * * * *

UNITED STATES PATENT AND TRADEMARK OFFICE
CERTIFICATE OF CORRECTION

PATENT NO. : 5,530,646
DATED : June 25, 1996
INVENTOR(S) : Eric J. Schoen

It is certified that error appears in the above-identified patent and that said Letters Patent is hereby corrected as shown below:

Column 16, line 1, claim 15, change "method" to --system--.

Column 16, line 1, claim 16, change "method" to --system--.

Signed and Sealed this

Nineteenth Day of November, 1996

*Attest:*

BRUCE LEHMAN

*Attesting Officer*  *Commissioner of Patents and Trademarks*